(12) United States Patent (10) Patent No.: US 8,559,816 B2
Zheng (45) Date of Patent: Oct. 15, 2013

(54) EXTENDER BOX, DATA TRANSMISSION METHOD AND PASSIVE OPTICAL NETWORK SYSTEM

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 12/982,335

(22) Filed: Dec. 30, 2010

(65) Prior Publication Data

US 2011/0129214 A1 Jun. 2, 2011

Related U.S. Application Data

(63) Continuation of application No. PCT/CN2009/072772, filed on Jul. 15, 2009.

(30) Foreign Application Priority Data

Jul. 16, 2008 (CN) .......................... 2008 1 0029506

(51) Int. Cl.
  *H04B 10/10* (2013.01)
  *H04B 10/25* (2013.01)
(52) U.S. Cl.
  CPC ................................. *H04B 10/2504* (2013.01)
  USPC .............................................. 398/66; 398/17
(58) Field of Classification Search
  USPC ......................... 398/27, 41, 42, 58, 5, 66, 17
  See application file for complete search history.

(56) References Cited

U.S. PATENT DOCUMENTS 6,909,821 B2 * 6/2005 Ravasio et al. .................. 385/24
8,090,258 B2 * 1/2012 DeLew et al. .................. 398/22

2002/0071149 A1 6/2002 Xu et al.
2004/0247246 A1 12/2004 Lee et al.
2006/0093360 A1 * 5/2006 Kim et al. ...................... 398/71

(Continued)

FOREIGN PATENT DOCUMENTS

CN        1547335 A      11/2004
CN      101114885 A       1/2008
EP       1 387 511 A2     2/2004
WO       01/50644 A1      7/2001

OTHER PUBLICATIONS

International Search Report for PCT/CN2009/072772 mailed Oct. 22, 2009.

(Continued)

*Primary Examiner* — Danny Leung
(74) *Attorney, Agent, or Firm* — Staas & Halsey LLP

(57) ABSTRACT

An extender box (EB) includes: a downlink data sending module configured to send downlink data to first passive optical network (PON) devices; at least two uplink data receiving modules configured to receive uplink data sent from a corresponding first PON device respectively; and a duplexer configured to convert the data transmission mode used by the downlink data sending module and the uplink data receiving modules from dual-fiber transmission to single-fiber transmission to implement single-fiber bidirectional transceiving. The uplink data receiving modules have ports corresponding to uplink ports of the first PON devices on a one-to-one basis. Optical fibers of the uplink data receiving modules that are connected with the uplink ports of the first PON devices are separated from optical fiber of the downlink data sending module, where the optical fiber is connected with downlink ports of the first PON devices. A data transmission method and a PON system are also disclosed.

9 Claims, 10 Drawing Sheets

(56) References Cited

U.S. PATENT DOCUMENTS

| | | |
|---|---|---|
| 2006/0153567 A1* | 7/2006 | Kim et al. .................... 398/72 |
| 2007/0154217 A1* | 7/2007 | Kim et al. .................... 398/72 |
| 2009/0196598 A1* | 8/2009 | Duan et al. .................... 398/5 |
| 2009/0208210 A1* | 8/2009 | Trojer et al. .................. 398/58 |
| 2010/0183298 A1* | 7/2010 | Biegert et al. ................ 398/17 |
| 2010/0196011 A1 | 8/2010 | Liu et al. |

OTHER PUBLICATIONS

Written Opinion of the International Searching Authority mailed Oct. 22, 2009 issued in corresponding International Patent Application No. PCT/CN2009/072772.

European Search Report dated Jan. 19, 2012 issued in corresponding European Patent Application No. 09797396.0.

Anthony Nkansah et al., "Multilevel Modulated Signal Transmission Over Serial Single-Mode and Multimode Fiber Links Using Vertical-Cavity Surface-Emitting Lasers for Millimeter-Wave Wireless Communications", IEEE Transactions on Microwave Theory and Techniques, vol. 55, No. 6, Jun. 2007, pp. 1219-1228.

M. Presi et al., "A full-duplex symmetric WDM-PON featuring OSSB downlink modulation with optical down-conversion", Optical Fiber Communication/National Fiber Optic Engineers Conference, 2008, pp. 1-3.

Chinese Office Action mailed Feb. 5, 2013 for corresponding Chinese Application No. 200810029506.X.

Chinese Search Report mailed Jan. 24, 2013 for corresponding Chinese Application No. 200810029506X.

Chinese Office Action issued Jun. 15, 2012 in corresponding Chinese Patent Application No. 200810029506.X.

Chinese Office Action mailed Aug. 5, 2013 in corresponding Chinese Application No. 200810029506.X.

\* cited by examiner

EXTENDER BOX, DATA TRANSMISSION METHOD AND PASSIVE OPTICAL NETWORK SYSTEM

CROSS-REFERENCE TO RELATED APPLICATIONS

This application is a continuation of International Application No. PCT/CN2009/072772, filed on Jul. 15, 2009, which claims priority to Chinese Patent Application No. 200810029506.X, filed on Jul. 16, 2008, both of which are hereby incorporated by reference in their entireties.

FIELD OF THE INVENTION

The present invention relates to an optical communication technology, and in particular, to an extender box, a data transmission method and a passive optical network system.

BACKGROUND OF THE INVENTION

Optical fibers have advantages such as a wide transmission frequency band, large capacity, low consumption and good capability of resisting interference. Therefore, they are suitable to be used as transmission media of high-speed and wideband services. In various optical access technologies, the passive optical network (PON), which is currently in use, is drawing wide attention.

The PON technology is a point to multi-point (P2MP) optical access technology, including an optical line terminal (OLT), an optical splitter, optical network units (ONUs)/optical network terminals (ONTs) and optical fibers connecting these devices. The OLT, as an office-end device, is connected with the optical splitter by using a backbone optical fiber, and the optical splitter is connected to each ONU by using a separate branch optical fiber. The optical splitter implements the optical splitting function in the downlink direction to send downlink optical signals of the OLT to all the ONUs by using the branch optical fibers, and implements the optical signal aggregation function in the uplink direction to aggregate optical signals sent from all the ONUs and send the aggregated signals to the OLT by using the backbone optical fiber. To prevent the collision of uplink data sent from each ONU in the uplink direction, the OLT must measure the distance of each ONU to control the time and the duration when and during which each ONU occupies an uplink optical fiber, and meanwhile, each ONU is required to send the uplink data by using the burst time division multiple access (TDMA) multiplexing.

To support the long reach data transmission between the OLT and the ONUs, the optical signals in the optical fibers need to be amplified, and thus a long reach PON (LR-PON) is derived. As illustrated in FIG. 1, an optical amplifier (OA) or an optical-electrical-optical (OEO) converter is added in the optical transmission channel. In general, the optical splitter and the OA/OEO converter may be integrated in a same device, called an extender box (EB). The topology between the EB and the ONUs is P2MP, so it is the topology between the OLT and the ONUs.

Generally, a distributed base station (BS) includes a radio remote unit (RRU) and a baseband unit (BBU). The RRU is usually placed indoors, so the home BS is usually the RRU of the BS. The RRU and the BBU are connected with each other by using a private optical interface through an uplink optical fiber and a downlink optical fiber. The private optical interface cannot form the industrial scale effect, thus having high costs. When the standardized PON is used as a normalized interface between the RRU and the BBU of the BS, because the PON adopts the single-fiber bidirectional technology, a duplexer or a wavelength division multiplexing (WDM) module needs to be added in the RRU and the BBU to support the single-fiber bidirectional technology of the PON. The duplexer is high in costs, while, in general, only the RRU of the home BS with low costs is acceptable to users. How to use the standardized PON as the interface between the RRU and the BBU and how to control the costs of the home BS to a smaller range become critical problems.

In addition, when used as the backhaul of the BS, the PON is a transmission technology instead of a simple access technology, so the system security requirement of the PON is much higher than that of the PON used as a simple access technology. Operators especially require that the PON system should be able to resist the abnormal luminescence of ONU devices, which is actually a denial of service (DoS) damaging the connection of the physical layer.

In normal circumstances, each ONU sends data by occupying an uplink channel according to the authorization of the OLT, so that the signal collision of the network will not occur. However, when the ONU devices randomly or permanently occupy the uplink channels because of faults and not responding to the authorization of the OLT, or when some malicious ONUs freely occupy the uplink channels, the PON will be in a state of paralysis, thus affecting the normal working of the 802.16 BS. It is impossible to locate the faulty ONU devices due to the passive characteristics of branch nodes. When used as the backhaul of the BS, the PON is required to resist the abnormal luminescence of the ONU devices, and this security requirement is a critical technical problem to be solved.

SUMMARY OF THE INVENTION

The technical problem to be solved by the present invention is to provide an EB, a data transmission method and a PON system to implement conversion from the dual-fiber transmission of the home BS to the single-fiber transmission of the PON by the EB.

According to one aspect, an embodiment of the present invention provides an EB. The EB includes:
  a downlink data sending module configured to send downlink data to first PON devices;
  at least two uplink data receiving modules configured to receive uplink data sent from a corresponding first PON device respectively; and
  a duplexer configured to convert a data transmission mode used by the downlink data sending module and the uplink data receiving modules from dual-fiber transmission to single-fiber transmission to implement single-fiber bidirectional transceiving.

The uplink data receiving modules have ports that are connected with uplink ports of the first PON devices and correspond to the uplink ports on a one-to-one basis.

Optical fibers of the uplink data receiving modules that are connected with the uplink ports of the first PON devices are separated from optical fiber of the downlink data sending module, where the optical fiber is connected with downlink ports of the first PON devices.

According to another aspect, an embodiment of the present invention further provides a data transmission method. The method includes:
  receiving, by at least two uplink data receiving modules, uplink data sent from corresponding first PON devices respectively, and sending the uplink data to a second PON device; and sending, by a downlink data sending module, downlink data to the first PON devices.

The uplink data receiving modules have ports that are connected with uplink ports of the first PON devices and correspond to the uplink ports on a one-to-one basis.

Optical fibers of the uplink data receiving module that are connected with the uplink ports of the first PON devices are separated from optical fiber of the downlink data sending module, where the optical fiber is connected with downlink ports of the first PON devices.

According to a third aspect, an embodiment of the present invention further provides a PON system that includes first PON devices, an EB and a second PON device. The EB includes:

a downlink data sending module configured to send downlink data to the first PON devices;

at least two uplink data receiving modules configured to receive uplink data sent from corresponding first PON devices respectively; and a duplexer configured to convert a data transmission mode used by the downlink data sending module and the uplink data receiving modules from dual-fiber transmission to single-fiber transmission to implement single-fiber bidirectional transceiving.

The uplink data receiving modules have ports that are connected with uplink ports of the first PON devices and correspond to the uplink ports on a one-to-one basis.

Optical fibers of the uplink data receiving modules that are connected with the uplink ports of the first PON devices are separated from optical fiber of the downlink data sending module, where the optical fiber is connected with downlink port of the first PON devices.

In the embodiments of the present invention, the PON uplink ports of ONUs used as the backhaul of the BS are separated from PON downlink port of the ONUs; and the EB implements the conversion from the dual-fiber transmission of the home BS to the single-fiber transmission of the PON, detects the abnormal luminescence of the ONU devices of the home BS and disconnects the uplink channels of the corresponding ports, thus enhancing the stability of the PON and guaranteeing the normal working of the BS.

DETAILED DESCRIPTION OF THE EMBODIMENTS

The following further describes the embodiments of the present invention with reference to the accompanying drawings.

Figure 1:
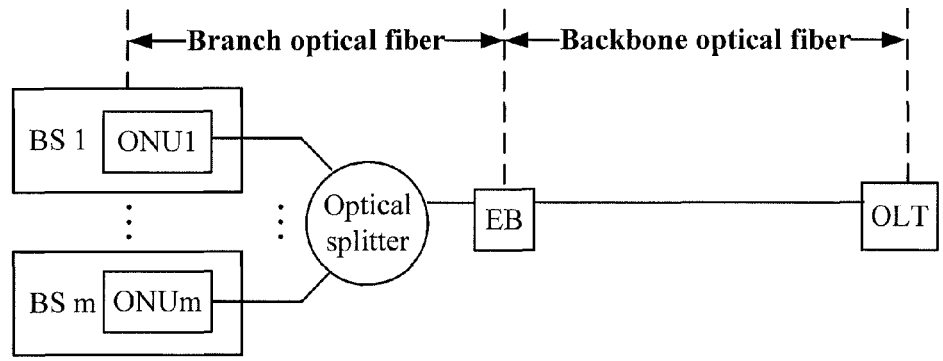
FIG. 1 is a schematic diagram of a network structure of an LR-PON in the prior art.
Figure 2:
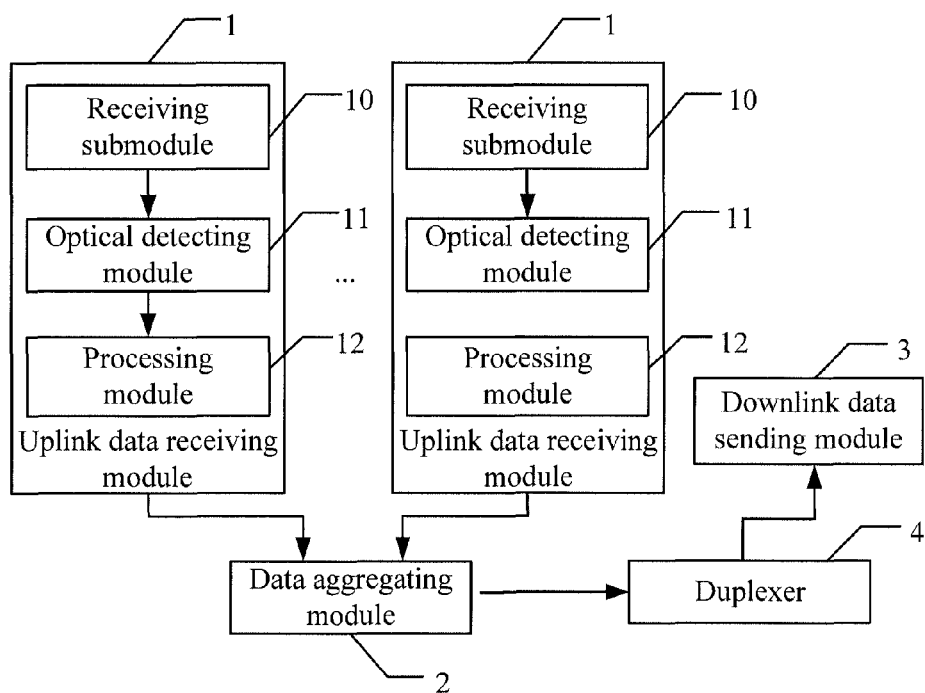
FIG. 2 is a schematic structure diagram of an EB of a PON according to an embodiment of the present invention.

FIG. 2 is a schematic structure diagram of an EB of a PON according to an embodiment of the present invention. As illustrated, the EB includes: a downlink data sending module 3 configured to send downlink data to first PON devices; uplink data receiving modules 1 configured to receive uplink data sent from a corresponding first PON device; and a duplexer 4 configured to convert the data transmission mode used by the downlink data sending module 3 and the uplink data receiving modules 1 from dual-fiber transmission to single-fiber transmission to implement single-fiber bidirectional transceiving. The uplink data receiving modules 1 have ports that are connected with uplink ports of the first PON devices and correspond to the uplink ports on a one-to-one basis. Optical fibers of the uplink data receiving modules 1 that are connected with the uplink ports of the first PON devices are separated from optical fiber of the downlink data sending module 3, where the optical fiber is connected with the downlink ports of the first PON devices.

The dual-fiber transmission means that uplink data transmission and downlink data transmission each occupies one optical fiber; that is, data reception is separated from data transmission. The single-fiber transmission means that one optical fiber is used for both uplink data transmission and downlink data transmission; that is, bidirectional transceiving is implemented on a single fiber.

In an embodiment of the present invention, the first PON device may be an OLT, or an ONU.

In an embodiment of the present invention, the EB further includes a data aggregating module 2 configured to: when the ONU transmits data to the OLT, aggregate the uplink data received by the uplink data receiving modules 1 and send the aggregated data to the duplexer 4.

In the embodiment and the following embodiments, the ONU is used as the first PON device and the OLT is used as the second PON device for the detailed description of the present invention.

The EB provided by the embodiment of the present invention may have the following implementation. The EB includes: a downlink data sending module 3 configured to send downlink data to an ONU; at least two uplink data receiving modules 1 configured to receive uplink data sent from a corresponding ONU; a data aggregating module 2 configured to aggregate the uplink data received by the uplink data receiving modules 1; and a duplexer 4 configured to convert the data aggregated by the data aggregating module 2 into the single-fiber mode and the data sent from the OLT to the downlink data sending module 3 into the dual-fiber mode to implement single-fiber bidirectional transceiving. The uplink data receiving modules 1 have ports that are connected with uplink ports of the ONUs and correspond to the uplink ports of the ONUs on a one-to-one basis. Ports of the uplink data receiving modules 1 that are connected with the uplink ports of the ONUs are separated from port of the downlink data sending module 3, where the port of the downlink data sending module 3 is connected with downlink ports of the ONUs.

In an embodiment, the PON uplink ports are separated from PON downlink ports. The uplink ports use the P2P topology, and the downlink ports use the P2MP topology.

The optical network unit in the embodiment of the present invention may be an ONU or an ONT.

The uplink data receiving module 1 further includes:

a receiving submodule 10 configured to receive uplink data sent from the corresponding ONU;

an optical detecting module 11, which may be an optical detector (OD) in the embodiment of the present invention, configured to detect the uplink data sent from the ONU and acquire a detection result; and a processing module 12 configured to disconnect an uplink channel corresponding to the uplink data sent by the ONU according to the detection result from the optical detecting module 11.

The processing module 12 may be an optical switch in the embodiment of the present invention.

In the embodiment of the present invention, at least two uplink data receiving modules 1 are included, as illustrated in FIG. 2.

The receiving submodule 10 may be a tap configured to receive uplink data sent from a corresponding ONU and tap a part of the uplink data to the optical detecting module 11 for detection.

The data aggregating module 2 includes an optical splitter or a wavelength division multiplexer (WDM) and is configured to aggregate the uplink data received by the uplink data receiving modules 1.

The receiving submodule 10 may be an optical receiving module (RX) configured to receive uplink data sent from the corresponding ONU and convert the uplink data into electrical signals.

The data aggregating module 2 may be an electrical aggregating module configured to aggregate multi-path electrical signals converted by the optical receiving modules.

The receiving submodule 10 may be an Ethernet receiving module (ETH RX) configured to receive uplink data sent from a corresponding ONU.

The data aggregating module 2 may be a network aggregating module configured to aggregate uplink data received by the Ethernet receiving modules.

The EB further includes:

an embedded ONU configured to measure the power and the bit error rate of the uplink data and report a measurement result to the OLT. The embedded ONU may be an embedded ONT in the embodiment of the present invention. In a specific implementation, the embedded ONT reports faulty PON ports on the EB and/or ONUs/ONTs corresponding to the PON ports to the OLT which manages and configures the OD through the embedded ONT. Optionally, according to the time and the duration when and during which the ONUs/ONTs occupy uplink optical fibers at each PON port of the EB provided by the embedded ONT, the power and the bit error rate of optical signals from the PON ports at the ONUs are measured within a corresponding period. Optionally, the measurement result of the uplink optical signals is reported to the OLT by the embedded ONT to support the diagnosis of optical lines.

Figure 3:
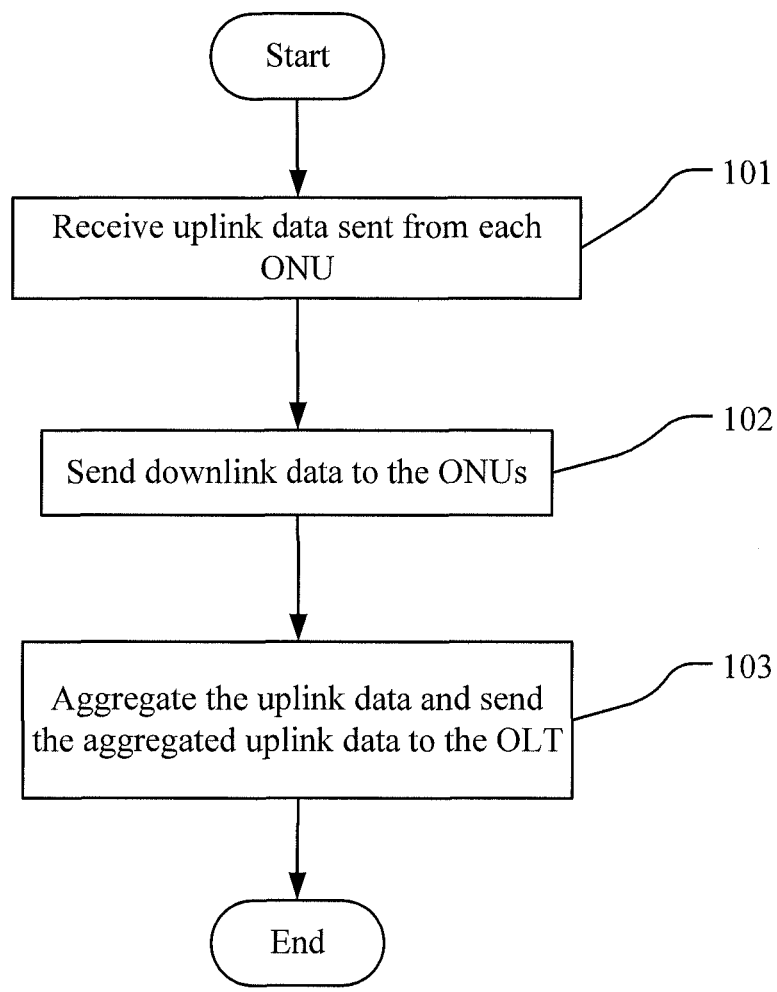
FIG. 3 is a flowchart of a data transmission method of a PON according to an embodiment of the present invention.

FIG. 3 is a flowchart of a data transmission method according to an embodiment of the present invention. As illustrated, the method includes the following steps:

101: Receive uplink data sent from each ONU.

102: Send downlink data to the ONUs.

103: Aggregate the uplink data and send the aggregated uplink data to the OLT.

The uplink data receiving module has ports that are connected with uplink ports of the ONUs and correspond to the uplink ports of the ONUs on a one-to-one basis.

Ports of the uplink data receiving module that are connected with the uplink ports of the ONUs are separated from port of the downlink data sending module, where the port of the downlink data sending module is connected with downlink ports of the ONUs.

Steps 101 and 102 may be simultaneously performed in the embodiment of the present invention.

Figure 4:
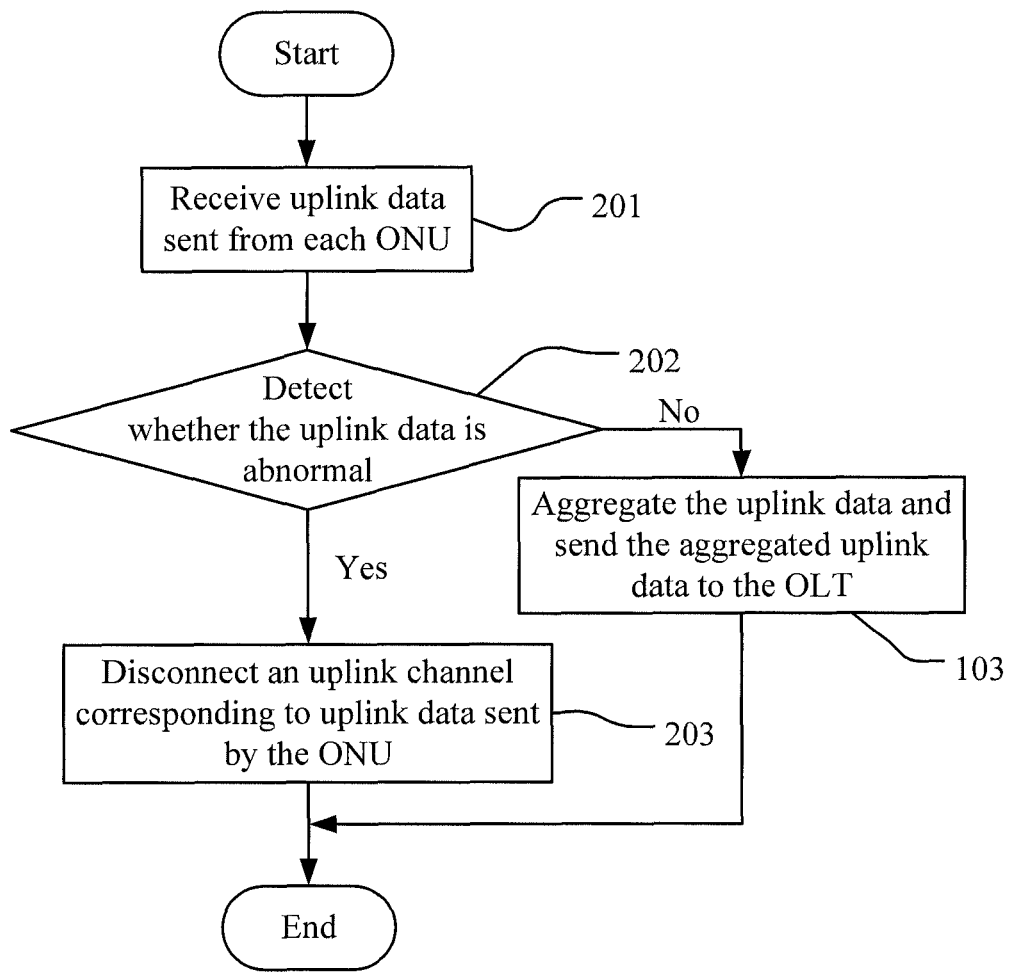
FIG. 4 is a detailed flowchart of receiving uplink data sent from each ONU according to an embodiment of the present invention.

FIG. 4 is a detailed flowchart of receiving uplink data sent from each ONU according to an embodiment of the present invention. As illustrated, step 101 further includes the following:

201: Receive uplink data sent from each ONU.

202: Detect whether the uplink data is abnormal, and if so, perform step 203, or else, perform step 103 in FIG. 3.

203: Disconnect an uplink channel corresponding to uplink data sent by the ONU.

The method of the embodiment of the present invention further includes:

when the EB includes a tap, after step 101, tapping a part of the uplink data for detection.

Step 103 further includes:

aggregating the uplink data;

amplifying the aggregated uplink data; and sending the amplified data to the OLT.

The PON system according to an embodiment of the present invention includes first PON devices, an EB and a second PON device. The EB includes:

a downlink data sending module configured to send downlink data to the first PON devices;

an uplink data receiving module configured to receive uplink data sent from a corresponding first PON device; and a duplexer configured to convert the data transmission mode used by the downlink data sending module and the uplink data receiving module from dual-fiber transmission to single-fiber transmission to implement single-fiber bidirectional transceiving.

The uplink data receiving module has ports that are connected with uplink ports of the first PON devices and correspond to the uplink ports on a one-to-one basis.

Optical fibers of the uplink data receiving module that are connected with the uplink ports of the first PON device are separated from optical fiber of the downlink data sending module, where the optical fiber is connected with downlink ports of the first PON devices.

In the embodiment of the present invention, the first PON device may be an OLT or an ONU. Herein, the ONU is used as the first PON device and the OLT is used as the second PON device for the detailed description of the PON system provided by the present invention.

In the embodiment of the present invention, the EB may further include: a data aggregating module configured to aggregate uplink data received by the uplink data receiving modules and send the aggregated data to the duplexer.

The EB in the PON system provided by the embodiment of the present invention may have the following implementation. The EB includes: a downlink data sending module configured to send downlink data to an ONU; at least two uplink data receiving modules configured to receive uplink data sent from corresponding ONUs; a data aggregating module configured to aggregate the uplink data received by the uplink data receiving modules; and a duplexer configured to convert the data aggregated by the data aggregating module into the single-fiber mode and the data sent from the OLT to the downlink data sending module into the dual-fiber mode to implement single-fiber bidirectional transceiving. The uplink data receiving modules have ports that are connected with uplink ports of the ONUs and correspond to the uplink ports of the ONUs on a one-to-one basis. Ports of the uplink data receiving modules that are connected with the uplink ports of the ONUs are separated from port of the downlink data sending module, where the port of the downlink data sending module is connected with downlink ports of the ONUs.

In an embodiment, the PON uplink ports are separated from PON downlink ports. The uplink ports use the P2P topology, and the downlink ports use the P2MP topology.

The uplink data receiving module further includes:
a receiving submodule configured to receive uplink data sent from the corresponding ONU;
an optical detecting module configured to detect uplink data sent from the ONU and acquire a detection result; and
a processing module configured to disconnect an uplink channel corresponding to uplink data sent by the ONU when the detection result from the optical detecting module indicates that the uplink data is abnormal.

The EB further includes:
an embedded ONU configured to measure the power and the bit error rate of the uplink data and report a measurement result to the OLT.

The following further describes the EB, method and system provided by the embodiments of the present invention by taking the ONUs as the first PON devices and the OLT as the second PON device as an example and on the basis of FIGS. 5a, 5b, 6a, 6b, 7a, 7b, 8 and 9.

Figure 5A:
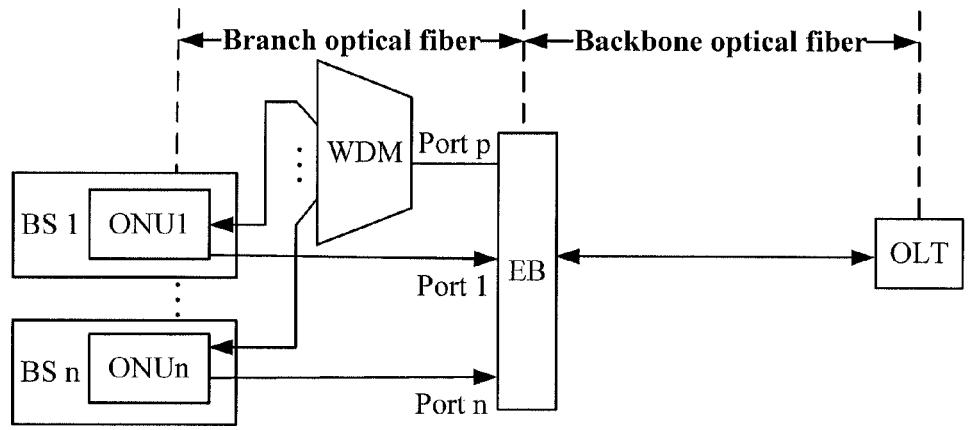
FIGS. 5a and 5b are schematic diagrams of network structures of an LR-PON supporting P2P and P2MP according to an embodiment of the present invention.
Figure 5B:
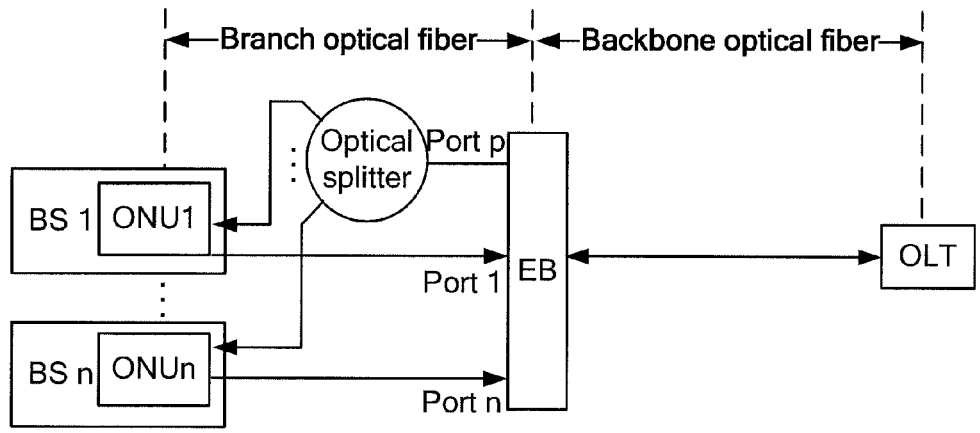

FIGS. 5a and 5b are schematic diagrams of network structures of the LR-PON supporting P2P and P2MP provided by an embodiment of the present invention. The PON uplink ports (ports 1 to n in FIGS. 5a and 5b) of the ONUs used as the backhaul of the BS are separated from the PON downlink port (port p in FIGS. 5a and 5b) of the ONUs. The uplink ports use the P2P topology to resist the abnormal luminescence of the ONU devices and the downlink port uses P2MP to save the optical fibers.

The optical fiber from the OLT to the EB still uses the single-fiber bidirectional transmission.

The EB is mainly configured to implement the conversion from the dual-fiber transmission of the home BS to the single-fiber transmission of the PON, and to resist the abnormal luminescence of the ONU module of the home BS. The EB may be arranged in the corridor of a building, and the BS may be arranged indoors. For cost considerations, the uplink of the ONU module of the RRU of the home BS is separated from the downlink so that the duplexer or the WDM module used for single-fiber bidirectional transmission in the ONU and the EB is saved. The distance from the RRU of the home BS to the EB is not long (at most about 100 m), so the costs of introducing the dual-fiber transmission for the uplink and downlink separation between the ONU and the EB is lower than that of adding a duplexer or a WDM module in the home BS, thus helping reduce the costs of wireless networks.

The optical splitter or the WDM in the figure may be integrated in the EB. In FIG. 5, the BS uses a WDM in the downlink direction, suitable for each ONU using a different wavelength, and, in FIG. 5b, the BS uses an optical splitter in the downlink direction, suitable for each ONU using the same or different wavelength.

The P2P connection from the ONUs to the EB in the uplink direction may even be an Ethernet physical layer connection, and the P2P connection from the OLT to the EB may also be an Ethernet physical layer connection. The data link layer may be the PON MAC layer.

In the hybrid topology, the OLT still measures the distance of each ONU to control the time and the duration when and during which each ONU occupies an uplink optical fiber, according to the distance measurement result.

The EB performs optical detection to each uplink PON port and, when abnormal luminescence of an uplink port occupying an uplink channel is found, disconnects the corresponding uplink port to prevent the ONU with the abnormal luminescence from occupying the uplink channel at the port.

Figure 6A:
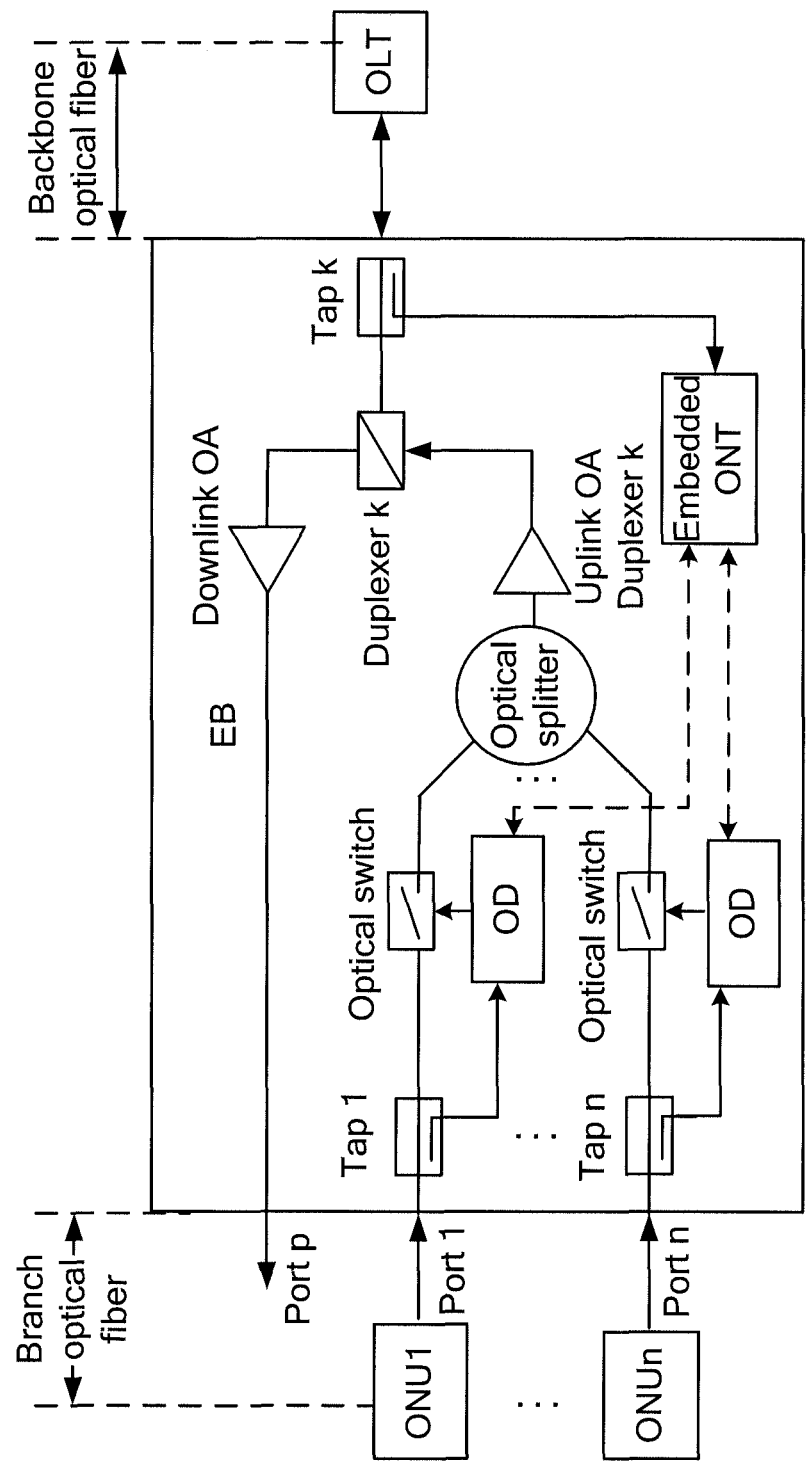
FIGS. 6a and 6b are system structure diagrams of PONS including OA-based EBs according to an embodiment of the present invention.
Figure 6B:
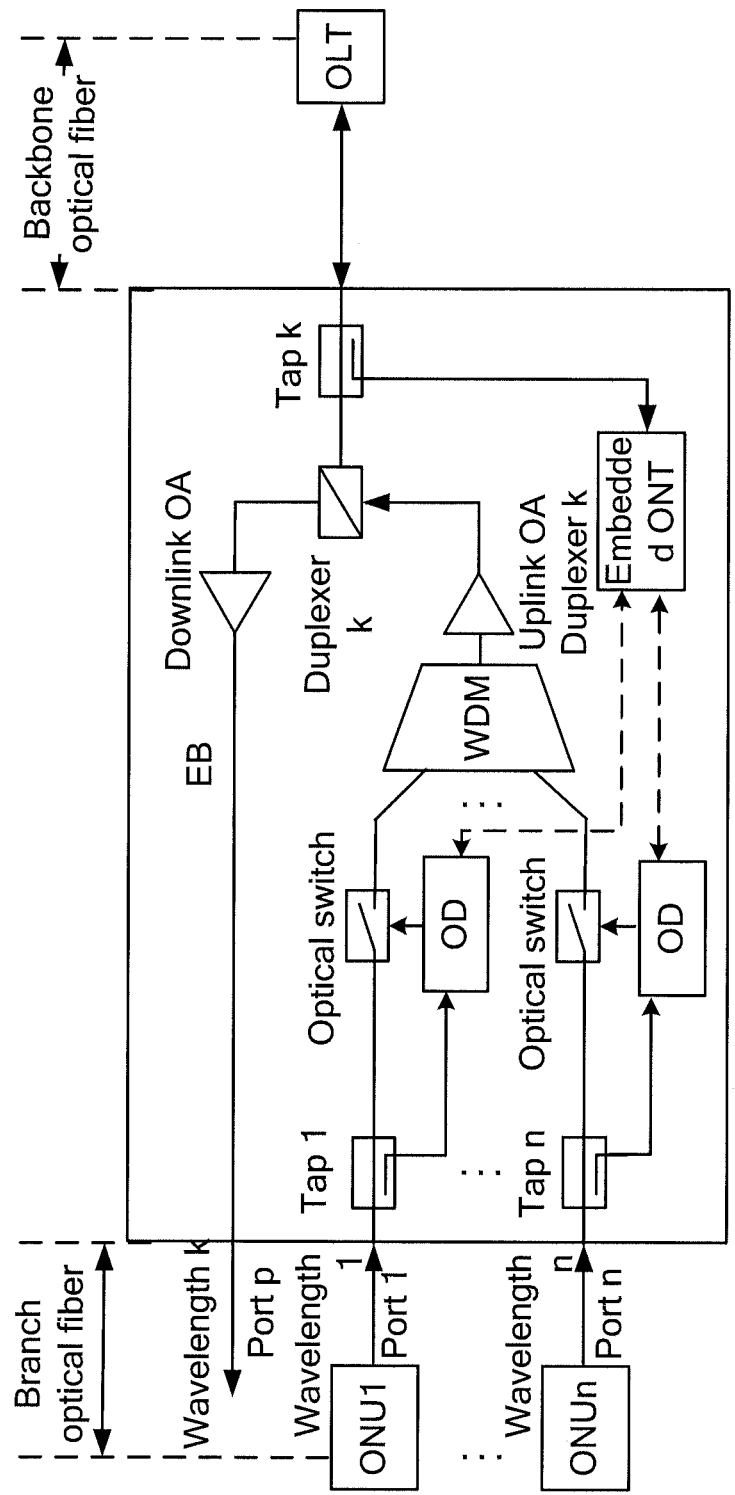

FIGS. 6a and 6b are system structure diagrams of PONs including OA-based EBs provided by an embodiment of the present invention. As illustrated, the EBs in the system are OA-based and each includes taps (taps 1 to n, and k), a duplexer (duplexer k, equivalent to the duplexer 4 in FIG. 2), an optical splitter or a WDM (equivalent to the data aggregating module 2 in FIG. 2), an optical switch (equivalent to the processing module 12 in FIG. 2), an OD (equivalent to the optical detecting module 11 in FIG. 2), an embedded ONT, an uplink OA and a downlink OA. FIGS. 6a and 6b differ from each other in that, in FIG. 6a, the BS uses the optical splitter in the uplink direction, suitable for each ONU using the same or different wavelength, and in FIG. 6b, the BS uses the WDM in the uplink direction, suitable for each ONU using a different wavelength. The tap, the optical switch and the OD are optional in other embodiments. When the uplink data needs no detection, the EB does not include an OD. When the uplink data needs detection, the EB includes an OD. Likewise, when relevant processing is not required, the EB does not include an optical switch. When the optical receiving module (RX) is configured to receive uplink data sent from the ONU, the tap may be not required, and the OD may be integrated in the optical receiving module.

Taps 1 to n are configured to tap a part of data of the uplink data respectively received from ONUs 1 to n to the OD corresponding to each uplink channel for the optical detection.

The OD is equivalent to an OLT receiver and is configured to:
1. identify and detect the uplink PON ports with abnormal luminescence, and parse the optical signals from the uplink PON ports; if the optical signals from an uplink port cannot be normally parsed, detect the ONU with abnormal luminescence in the optical port and trigger the optical switch to disconnect the uplink channel of the corresponding port;
2. optionally, report faulty PON ports on the EB and/or ONUs/ONTs corresponding to the PON ports to the OLT through the embedded ONT;
3. optionally, according to the time and the duration when and during which the ONUs/ONTs occupy an uplink optical fiber at each PON port of the EB provided by the embedded ONT, measure the power and the bit error rate of optical signals from the PON ports at the ONUs within a corresponding period; and
4. optionally, report the measurement result of the power of the bit error rate of the uplink optical signals to the OLT through the embedded ONT to support the diagnosis of optical lines.

The embedded ONT is configured to report faulty PON ports on the EB and/or ONUs/ONTs corresponding to the PON ports to the OLT which manages and configures the OD through the embedded ONT. Furthermore, optionally, the embedded ONT provides the OD with the time and the duration when and during which the ONUs/ONTs occupy an uplink optical fiber at each PON port allocated to the EB by the OLT. As illustrated in FIGS. 6a and 6b, the embedded ONT provides the OD with the time and the duration when and during which ONU 1 occupies an uplink optical fiber at PON port 1 allocated to the EB by the OLT, and provides the OD with the time and the duration when and during which ONU m occupies an uplink optical fiber at PON port m allocated to the EB by the OLT in the $m^{th}$ (1≤m≤n) channel. Correspondingly, the embedded ONT provides the OD with the time and the duration when and during which ONUs m+1, m+2 to n occupy uplink optical fibers at the corresponding PON ports allocated to the EB by the OLT.

The duplexer is configured to implement single-fiber bidirectional transceiving, and the conversion from the dual-fiber transmission of the home BS to the single-fiber transmission of the PON and conversion from the single-fiber transmission to the dual-fiber transmission.

The processes of identifying and detecting the PON ports with abnormal luminescence are as follows:

The EB picks up a part of light from each PON port through the tap and performs optical detection through the OD. When a port with abnormal luminescence occupying an uplink channel is determined, the OD triggers the optical switch to disconnect the uplink channel of the corresponding port and reports the faulty PON port on the EB and/or ONU/ONT corresponding to the PON port to the OLT through the embedded ONT.

When the ONU with abnormal luminescence is at a PON port of the BS, the OLT/EB can immediately locate the ONU with abnormal luminescence to isolate the uplink channel of the faulty PON port in time, thus guaranteeing that no impact is imposed on the uplink channels of other normal PON ports and the uplink channel of the faulty PON port. Through the downlink port p of the EB, the OLT commands the ONU at the faulty PON port to stop sending uplink optical signals.

Figure 7A:
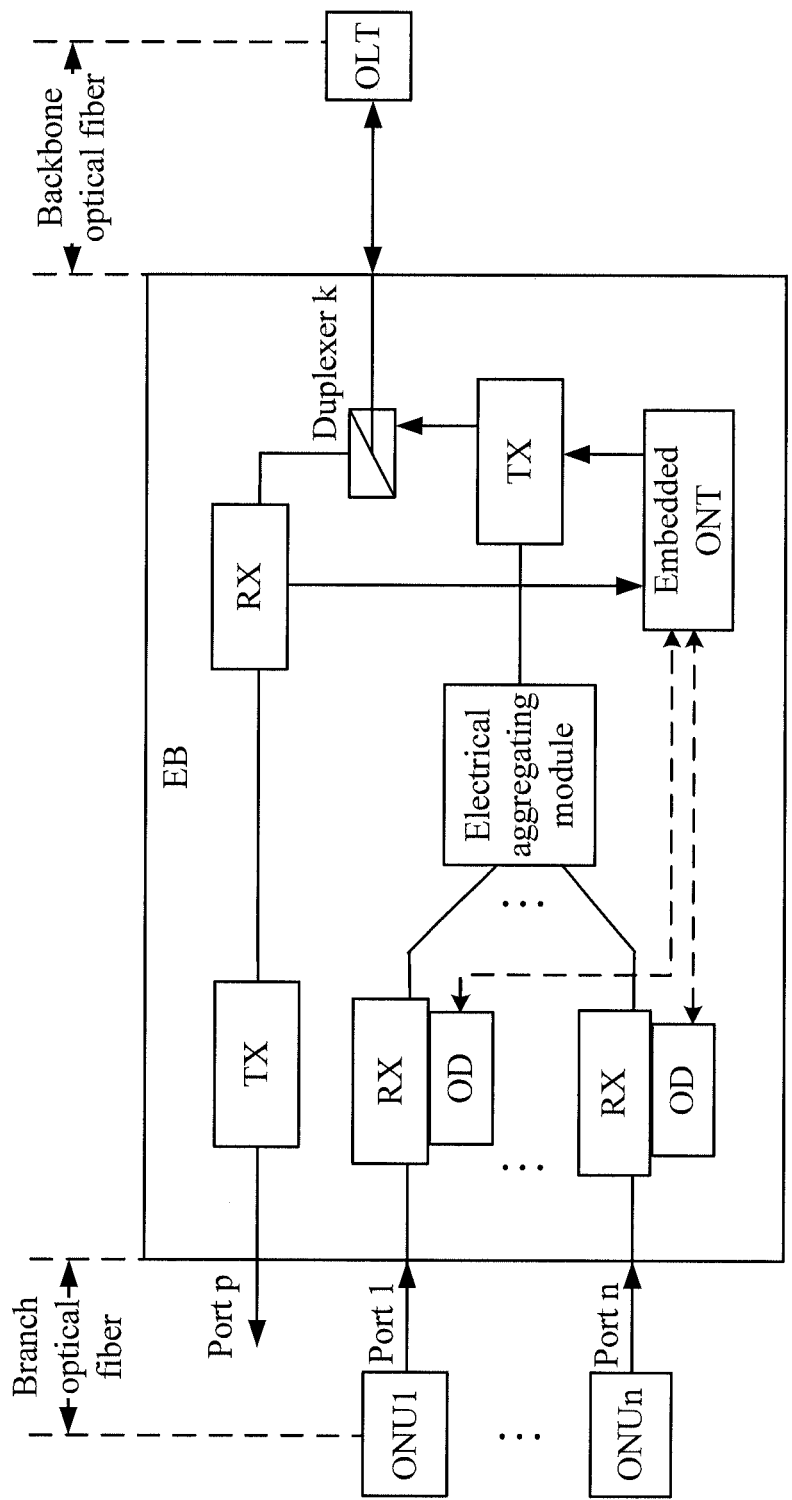
FIGS. 7a and 7b are system structure diagrams of PONS including OEO-based EBs according to an embodiment of the present invention.
Figure 7B:
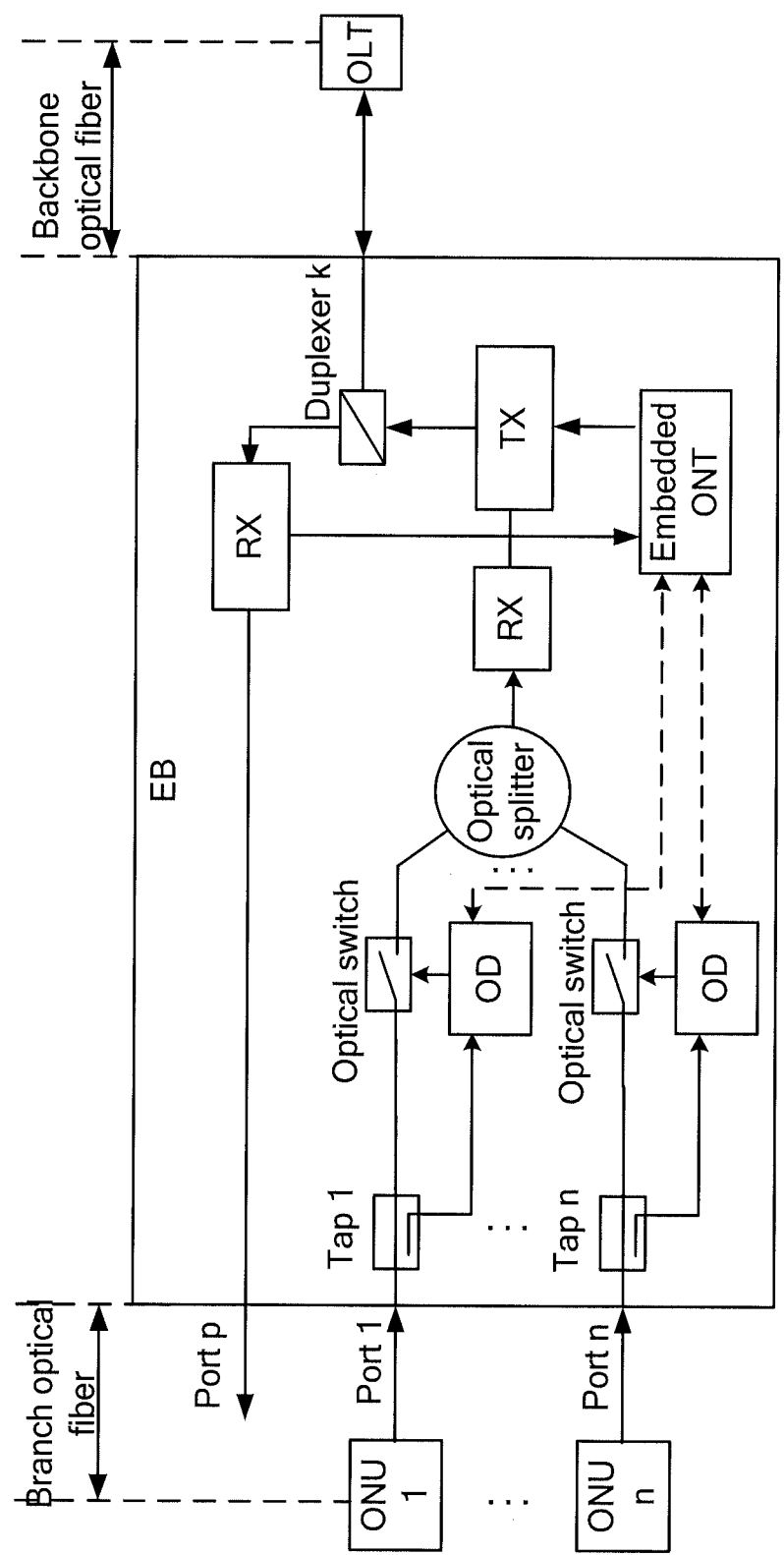

FIGS. 7a and 7b are system structure diagrams of PONs including OEO-based EBs provided by an embodiment of the present invention. As illustrated, the EBs in the system are OEO-based and each includes a duplexer k, an optical receiving module (RX) (equivalent to the uplink data receiving module 1 in FIG. 2), an optical sending module (TX) (equivalent to the downlink data sending module 3 in FIG. 2), an OD (equivalent to the optical detecting module 11 in FIG. 2) and an embedded ONT. In FIG. 7a, the EB further includes an electrical aggregating module (equivalent to the data aggregating module 2 in FIG. 2), and in FIG. 7b, the EB further includes an optical splitter (equivalent to the data aggregating module 2 in FIG. 2) and an optical switch (equivalent to the processing module 12 in FIG. 2). The tap, the optical switch and the OD are optional in other embodiments. When the uplink data requires no detection, the EB does not include an OD. When the uplink data requires detection, the EB includes an OD. Likewise, when relevant processing is not required, the EB does not include an optical switch. When the optical receiving module (RX) is configured to receive uplink data sent from the ONU, the tap may be not required, and the OD may be integrated in the optical receiving module.

The optical receiving module (RX) is configured to receive and convert optical signals into electrical signals. It may convert the optical signals of the PON physical layer into the electrical signals of the PON physical layer, and reproduce and add preambles, or terminate the PON physical layer to acquire PON MAC frames, which is equivalent to embedding a reception processing module of the OLT. In addition, the optical receiving module is integrated with the functions of the OD to stop the reception of the corresponding ports according to the trigger from the OD when the OD identifies the PON ports with abnormal luminescence.

The optical sending module (TX) is configured to convert electrical signals into optical signals and send the optical signals. It may convert the electrical signals of the PON physical layer into the optical signals of the PON physical layer for sending, or perform PON physical layer processing for the PON uplink MAC frames from the electrical aggregating module and send the optical signals.

The electrical aggregating module is configured to aggregate multi-path electrical signals into one-path electrical signals. It may aggregate the multi-path electrical signals of the PON physical layer into the one-path electrical signals of the PON physical layer through the TMD, or aggregate the multi-path PON uplink MAC frames into the one-path electrical signals through the TMD.

Figure 8:
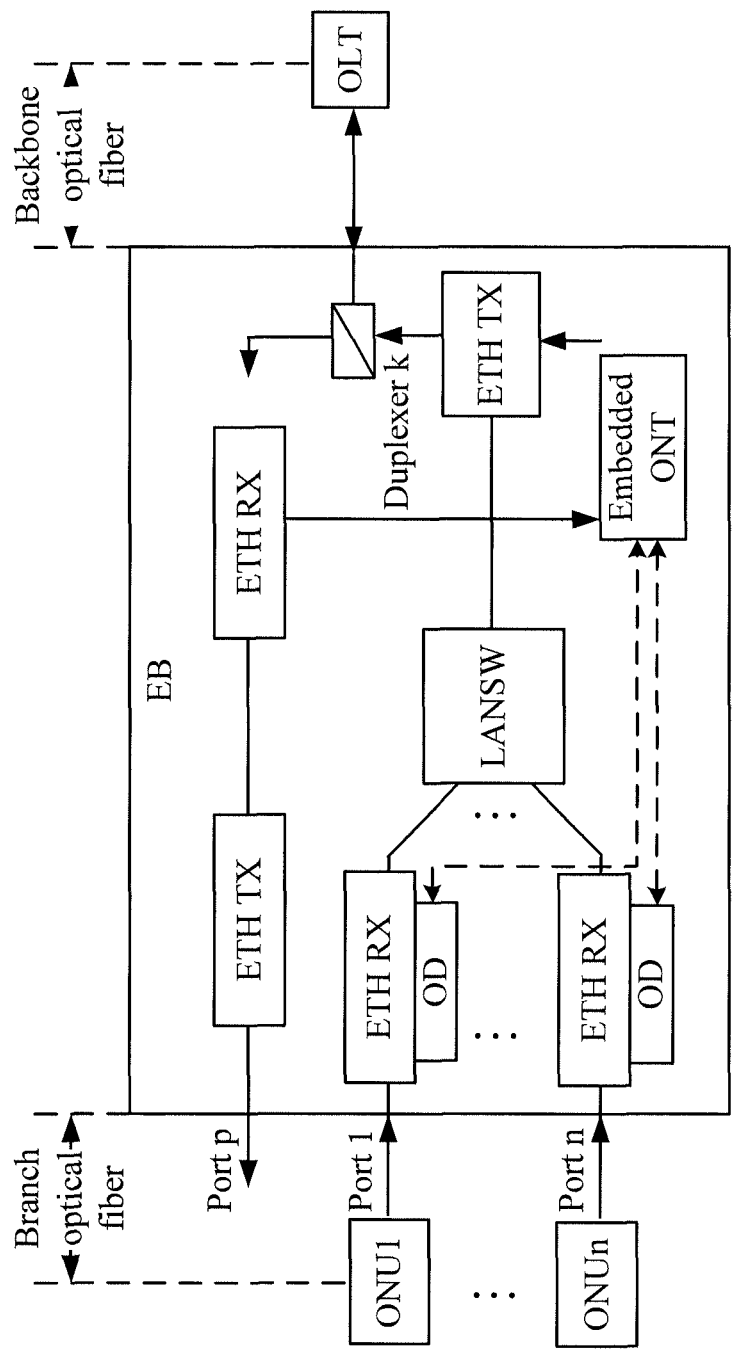
FIG. 8 is a system structure diagram of another PON including an OEO-based EB according to an embodiment of the present invention.

FIG. 8 is a system structure diagram of another PON including an OEO-based EB provided by an embodiment of the present invention. The system uses the hybrid technology of Ethernet and PON. The P2P connection from the ONU to the EB in the uplink direction may even be an Ethernet physical layer connection, and the P2P connection from the OLT to the EB may also be an Ethernet physical layer connection. The data link layer may be the PON MAC layer (such as the MAC layer of the EPON). As illustrated in FIG. 8, the difference from FIGS. 7a and 7b is as follows: the RX is the Ethernet receiving module (ETH RX), the TX is the Ethernet sending module (ETH TX), and the network aggregating module is equivalent to the electrical aggregating module in FIG. 7a and the optical splitter in FIG. 7b. The tap, the optical switch and the OD are optional in other embodiments. When the uplink data needs no detection, the EB does not include an OD. When the uplink data needs detection, the EB includes an OD. Likewise, when relevant processing is not required, the EB does not include an optical switch. When the optical receiving module (RX) is configured to receive uplink data sent from the ONU, the tap may be not required, and the OD may be integrated in the optical receiving module.

Figure 9:
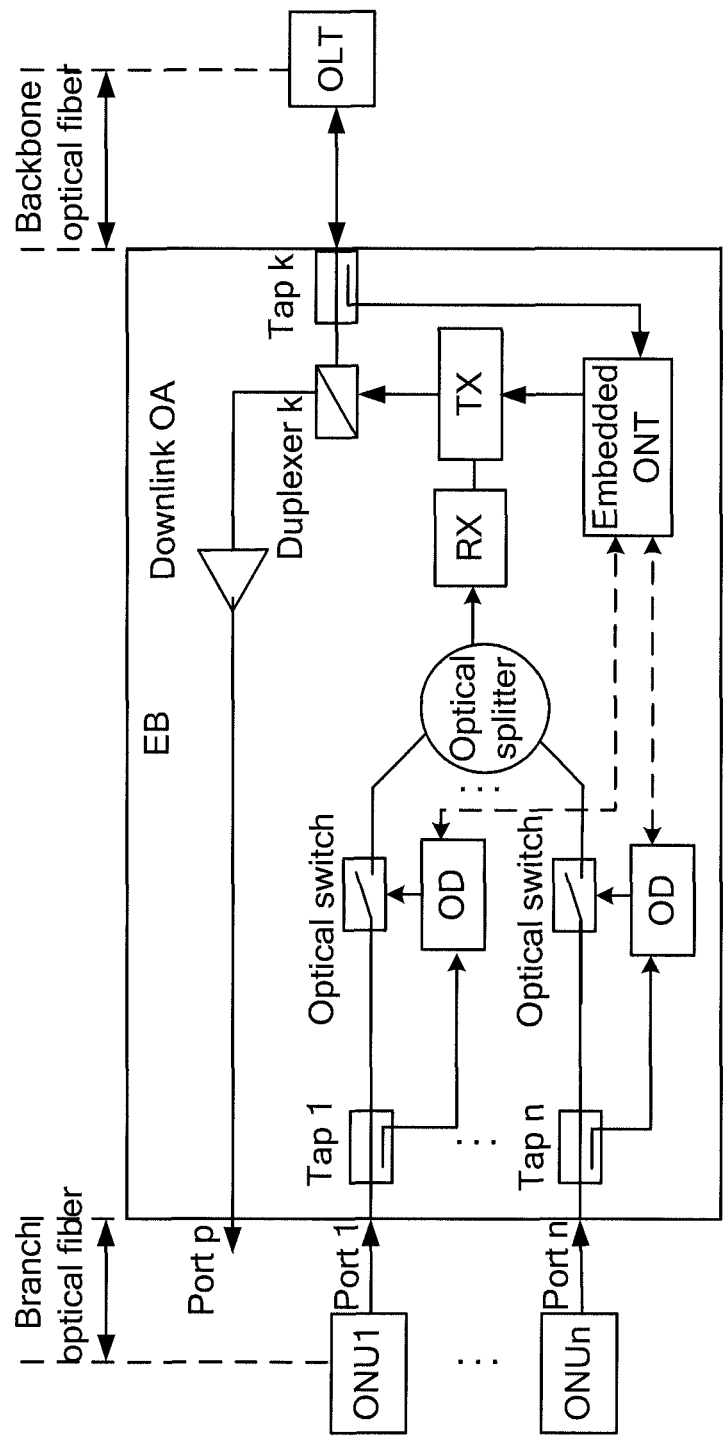
FIG. 9 is a system structure diagram of a PON including an OA-and-OEO-based hybrid EB according to an embodiment of the present invention.

FIG. 9 is a system structure diagram of a PON including an OA-and-OEO-based hybrid EB provided by an embodiment of the present invention, where the parts have the same functions as the corresponding modules or units above, thus needing no further description.

In the embodiments of the present invention, the PON uplink ports of ONUs used as the backhaul of the BS are separated from the PON downlink ports of the ONUs; and the EB implements the conversion from the dual-fiber transmission of the home BS to the single-fiber transmission of the PON, detects the abnormal luminescence of ONU devices of the home BS and disconnects the uplink channels of the corresponding ports, thus enhancing the stability of the PON and guaranteeing the normal working of the BS.

The above descriptions are merely preferred embodiments of the present invention, but not intended to limit the scope of the present invention. Any equivalent modifications made according to the claims of the present invention should fall within the scope of the present invention.

The invention claimed is:

1. An extender box (EB), comprising:
   a downlink data sending module configured to send downlink data to first passive optical network (PON) devices;
   at least two uplink data receiving modules configured to receive uplink data sent from a corresponding first PON device respectively;
   a duplexer configured to convert a data transmission mode used by the downlink data sending module and the uplink data receiving modules from dual-fiber transmission to single-fiber transmission to implement single-fiber bidirectional transceiving; and an embedded optical network unit configured to measure power and a bit error rate of the uplink data and report a measurement result to a second PON device;

wherein: the uplink data receiving modules have ports that are connected with uplink ports of the first PON devices and correspond to the uplink ports on a one-to-one basis; and optical fibers of the uplink data receiving modules that are connected with the uplink ports of the first PON devices are separated from optical fiber of the downlink data sending module, wherein the optical fiber is connected with downlink ports of the first PON devices.

wherein the first PON devices are optical network units (ONUs), the second PON device is an optical line terminal (OLT), the embedded optical network unit is an optical network terminal (ONT); and each uplink data receiving module comprises:

a receiving submodule configured to receive uplink data sent from a corresponding ONU, an optical detecting module configured to detect the uplink data sent from the corresponding ONU and acquire a detection result, and when the detection result indicates that the uplink data is abnormal, report to the OLT through the embedded ONT that the corresponding ONU is abnormal so that the OLT commands the corresponding ONU to stop sending uplink optical signals, and a processing module configured to disconnect an uplink channel corresponding to the uplink data sent by the corresponding ONU, when the detection result from the optical detecting module indicates that the uplink data is abnormal.

2. The EB according to claim 1, further comprising:
a data aggregating module configured to aggregate the uplink data received by the uplink data receiving modules and send the aggregated data to the duplexer.

3. The EB according to claim 2, wherein:
the receiving submodule is a tap configured to receive the uplink data sent from the corresponding ONU and tap a part of the uplink data to the optical detecting module for detection; and
the data aggregating module comprises an optical splitter or a wavelength division multiplexer (WDM) and is configured to aggregate the uplink data received by the uplink data receiving module.

4. The EB according to claim 2, wherein:
the receiving submodule is an optical receiving module configured to receive the uplink data sent from the corresponding ONU and convert the uplink data into electrical signals; and
the data aggregating module comprises an electrical aggregating module configured to aggregate multi-path electrical signals converted by the optical receiving module.

5. The EB according to claim 2, wherein:
the receiving submodule is an Ethernet receiving module configured to receive the uplink data sent from the corresponding ONU; and
the data aggregating module comprises a network aggregating module configured to aggregate the uplink data received by the Ethernet receiving module.

6. A data transmission method, comprising: receiving, by at least two uplink data receiving modules, uplink data sent from corresponding first passive optical network (PON) devices respectively;
sending, by a downlink data sending module, downlink data to the first PON devices;

converting, by a duplexer, a data transmission mode used by the downlink data sending module and the uplink data receiving modules from dual-fiber transmission to single-fiber transmission to implement single-fiber bidirectional transceiving; and measuring, by an embedded optical network unit, power and a bit error rate of the uplink data, and reporting, by the embedded optical network unit, a measurement result to a second PON device;

wherein:
the uplink data receiving modules have ports that are connected with uplink ports of the first PON devices and correspond to the uplink ports on a one-to-one basis, and optical fibers of the uplink data receiving modules that are connected with the uplink ports of the first PON devices are separated from optical fiber of the downlink data sending module, wherein the optical fiber is connected with downlink ports of the first PON devices; wherein the first PON devices are optical network units (ONUs), the second PON device is an optical line terminal (OLT), the embedded optical network unit is an optical network terminal (ONT), and said receiving uplink data sent from a corresponding ONU comprises:
receiving uplink data sent from a corresponding ONU,
detecting whether the uplink data is abnormal, and
when it is detected that the uplink data is abnormal, disconnecting an uplink channel corresponding to the uplink data sent by the corresponding ONU, and reporting to the OLT through the embedded ONT that the corresponding ONU is abnormal so that the OLT commands the corresponding ONU to stop sending uplink optical signals.

7. The method according to claim 6, after receiving the uplink data sent from each ONU, comprising:
tapping a part of the uplink data for detection.

8. A passive optical network (PON) system, comprising first PON devices, an extender box (EB) and a second PON device, the EB comprising:
a downlink data sending module configured to send downlink data to the first PON devices;
at least two uplink data receiving modules configured to receive uplink data sent from a corresponding first PON device respectively;
a duplexer configured to convert a data transmission mode used by the downlink data sending module and the uplink data receiving modules from dual-fiber transmission to single-fiber transmission to implement single-fiber bidirectional transceiving; and
an embedded optical network unit configured to measure power and a bit error rate of the uplink data and report a measurement result to the second PON device;
wherein: the uplink data receiving modules have ports that are connected with uplink ports of the first PON devices and correspond to the uplink ports on a one-to-one basis, and
optical fibers of the uplink data receiving modules that are connected with the uplink ports of the first PON devices are separated from optical fiber of the downlink data sending module, wherein the optical fiber is connected with downlink ports of the first PON devices, wherein
the first PON devices are optical network units (ONUs), the second PON device is an optical line terminal (OLT), the embedded optical network unit is an optical network terminal (ONT), and said receiving uplink data sent from a corresponding ONU comprises:

receiving uplink data sent from a corresponding ONU, detecting whether the uplink data is abnormal, and when it is detected that the uplink data is abnormal, disconnecting an uplink channel corresponding to the uplink data sent by the corresponding ONU, and reporting to the OLT through the embedded ONT that the corresponding ONU is abnormal so that the OLT commands the corresponding ONU to stop sending uplink optical signals.

9. The system according to claim 8, wherein the EB further comprises:

a data aggregating module configured to aggregate the uplink data received by the uplink data receiving modules and send the aggregated data to the duplexer.

* * * * *

UNITED STATES PATENT AND TRADEMARK OFFICE
CERTIFICATE OF CORRECTION

PATENT NO.        : 8,559,816 B2
APPLICATION NO.   : 12/982335
DATED             : October 15, 2013
INVENTOR(S)       : Zheng Page 1 of 2

It is certified that error appears in the above-identified patent and that said Letters Patent is hereby corrected as shown below:

In the Claims

Claim 8, Column 8, Line 58:

delete "and"

Claim 8, Column 12, Line 64:

after "devices," delete "wherein"

Claim 8, Column 13, Lines 3-14:

delete "said receiving uplink data sent from a corresponding ONU
comprises:
receiving uplink data sent from a corresponding ONU, detecting whether the uplink data is abnormal, and
when it is detected that the uplink data is abnormal, disconnecting an uplink channel corresponding to the uplink data sent by the corresponding ONU, and reporting to the OLT through the embedded ONT that the corresponding ONU is abnormal so that the OLT commands the corresponding ONU to stop sending uplink optical signals."
and insert
-- uplink data receiving module
comprises:
a receiving submodule configured to receive uplink data sent from a corresponding ONU, an optical detecting module configured to detect the uplink data sent from the corresponding ONU and acquire a detection result, and when the detection result indicates that the uplink data is abnormal, report to the OLT through the embedded ONT that the corresponding ONU is abnormal so that the OLT commands the corresponding ONU to stop sending uplink optical signals, and Signed and Sealed this
Twenty-third Day of June, 2015

Michelle K. Lee
*Director of the United States Patent and Trademark Office*

CERTIFICATE OF CORRECTION (continued)

a processing module configured to disconnect an uplink channel corresponding to the uplink data sent by the corresponding ONU when the detection result from the optical detecting module indicates that the uplink data is abnormal. --, therefor